United States Patent
Cotter et al.

(10) Patent No.: US 8,806,759 B2
(45) Date of Patent: Aug. 19, 2014

(54) AVOCADO TOOL

(75) Inventors: Jennifer K. Cotter, Seattle, WA (US); Lance L. Hood, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 134 days.

(21) Appl. No.: 13/364,519

(22) Filed: Feb. 2, 2012

(65) Prior Publication Data

US 2012/0198700 A1 Aug. 9, 2012

Related U.S. Application Data

(60) Provisional application No. 61/439,291, filed on Feb. 3, 2011.

(51) Int. Cl.
- *A47J 17/00* (2006.01)
- *A47J 25/00* (2006.01)
- *A47J 17/02* (2006.01)

(52) U.S. Cl.
CPC ...................................... *A47J 17/02* (2013.01)
USPC .................. 30/114; 30/117; 30/142; 30/302; 30/303

(58) Field of Classification Search
USPC .................. 30/114, 115, 142, 117, 302, 303; 99/541; 241/169.2; D7/682, 693
See application file for complete search history.

(56) References Cited

U.S. PATENT DOCUMENTS

| | | | |
|---|---|---|---|
| 1,213,561 A | 1/1917 | Walker | |
| D58,223 S * | 6/1921 | Goldsmith | D7/682 |
| 2,912,757 A | 11/1959 | Knight | |
| D194,799 S * | 3/1963 | Elder et al. | D7/682 |
| 3,259,980 A | 7/1966 | Espino | |
| 4,383,367 A | 5/1983 | Mielnicki | |
| D304,894 S * | 12/1989 | Carlson | D7/682 |
| 4,970,786 A | 11/1990 | Harper | |
| 5,035,056 A * | 7/1991 | Sheffield | 30/305 |
| 5,115,565 A | 5/1992 | Narlock et al. | |
| 5,533,442 A | 7/1996 | Tateno | |
| 5,613,431 A | 3/1997 | Tateno | |
| D390,071 S * | 2/1998 | Henry et al. | D7/682 |
| 5,947,595 A | 9/1999 | Eurisch et al. | |
| 5,983,505 A | 11/1999 | Gibson | |
| D488,360 S | 4/2004 | Young | |
| 6,796,032 B2 | 9/2004 | Horng | |
| D507,726 S | 7/2005 | Holcomb et al. | |
| 7,055,247 B2 | 6/2006 | Kaposi et al. | |
| 7,080,454 B2 | 7/2006 | Holcomb et al. | |
| 7,086,155 B2 * | 8/2006 | Chan et al. | 30/114 |
| 7,421,786 B2 * | 9/2008 | Dorion et al. | 30/114 |
| D648,992 S * | 11/2011 | Cotter et al. | D7/693 |
| 8,083,168 B2 * | 12/2011 | Park | 241/169.2 |
| 2008/0047149 A1 | 2/2008 | Webb | |
| 2009/0193981 A1 * | 8/2009 | Webb | 99/508 |
| 2011/0094394 A1 * | 4/2011 | Tateno | 99/541 |
| 2012/0198700 A1 * | 8/2012 | Cotter et al. | 30/123 |

* cited by examiner

*Primary Examiner* — Hwei C Payer
(74) *Attorney, Agent, or Firm* — Lowe Graham Jones PLLC

(57) ABSTRACT

An avocado tool includes a handle having a first end and a second end, with a different tool head on each end. At the first end, the tool head is in the form of a tool configured for slicing avocados. At the second end, the tool head is in the form of a masher.

11 Claims, 4 Drawing Sheets

AVOCADO TOOL

PRIORITY CLAIM

This application claims the benefit of provisional application Ser. No. 61/439,291 filed Feb. 3, 2011, the contents of which are incorporated by reference.

BACKGROUND OF THE INVENTION

For several years, avocado slicers have been a popular kitchen tool. Examples of such avocado slicers are described in U.S. Pat. Nos. 5,613,431 and 5,533,442, both of which are issued to Tateno. A more recent avocado slicer is described in U.S. Pat. No. 7,055,247 to Kaposi, et al. The existing avocado slicers provide a useful means of slicing avocados by providing a slicing hoop with internal tines secured to a handle. Current tools are ineffective, however, in providing a tool for further mashing avocado slices to prepare guacamole or other foods from avocados.

SUMMARY OF THE INVENTION

The preferred example of an avocado tool in accordance with the invention includes a handle having a first end and a second end, with a different tool head on each end. At the first end, the tool head is in the form of a tool configured for slicing avocados. In one example, the tool head includes a curved peripheral blade with several interior slicing blades. At the second end, the tool head is in the form of a masher. In one example, the masher includes several spokes extending radially outward and generally perpendicular to the handle. In other versions the mashing head includes tines or spokes in an alternate arrangement, positioned to allow the tines or spokes to be pressed into the avocado slices.

DETAILED DESCRIPTION OF THE PREFERRED EMBODIMENT

Figure 1:
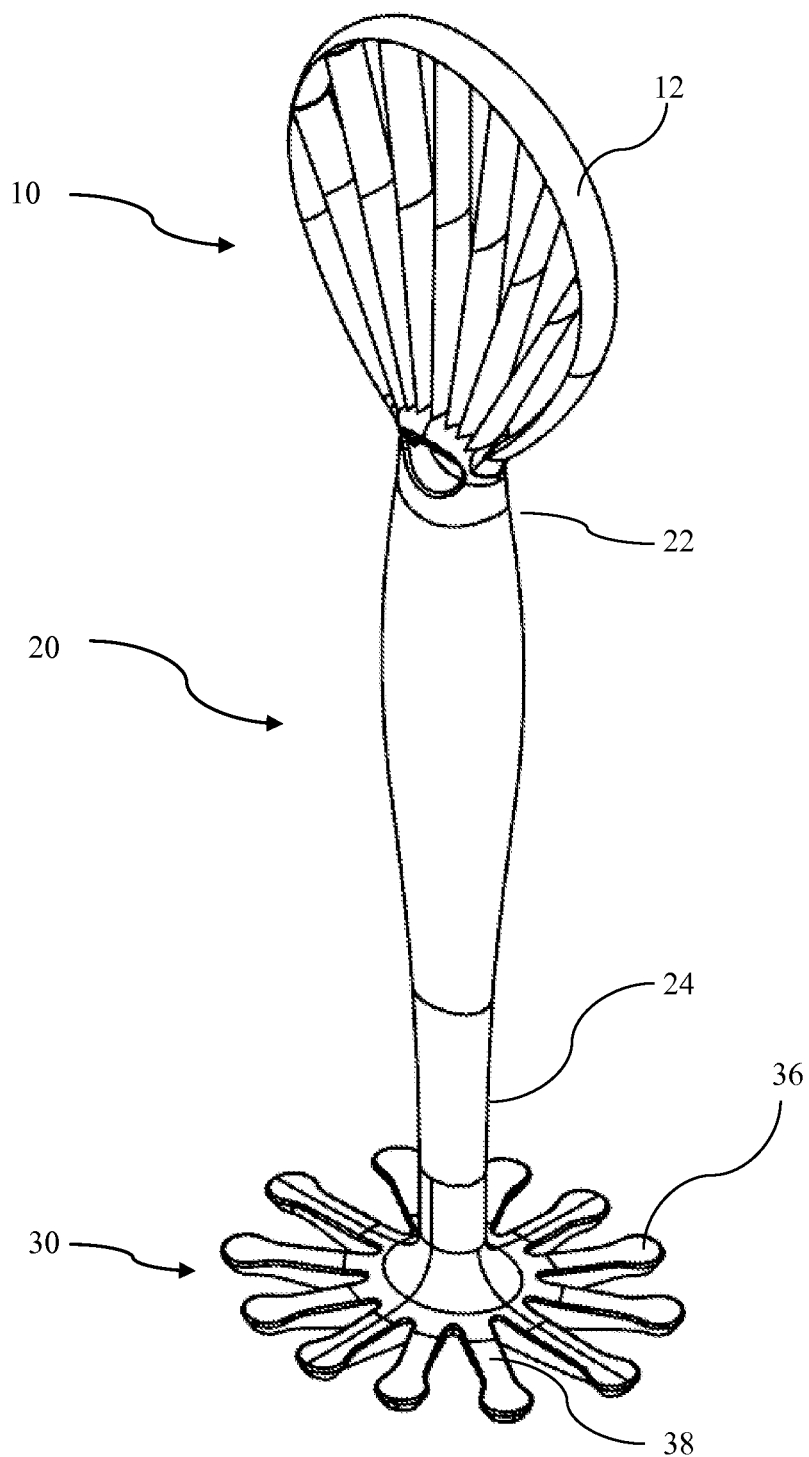
FIG. 1 is a top perspective view of a preferred avocado tool.
Figure 2:
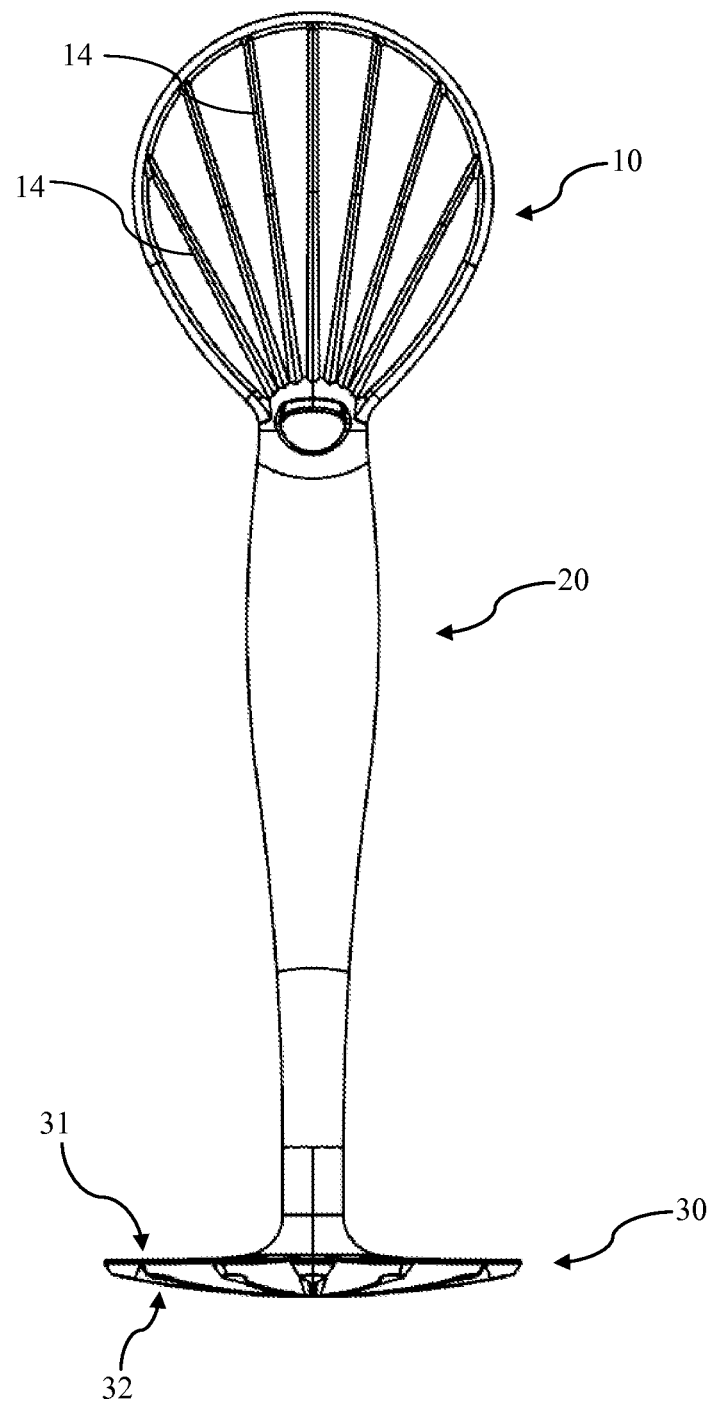
FIG. 2 is a front view of a preferred avocado tool.
Figure 3:
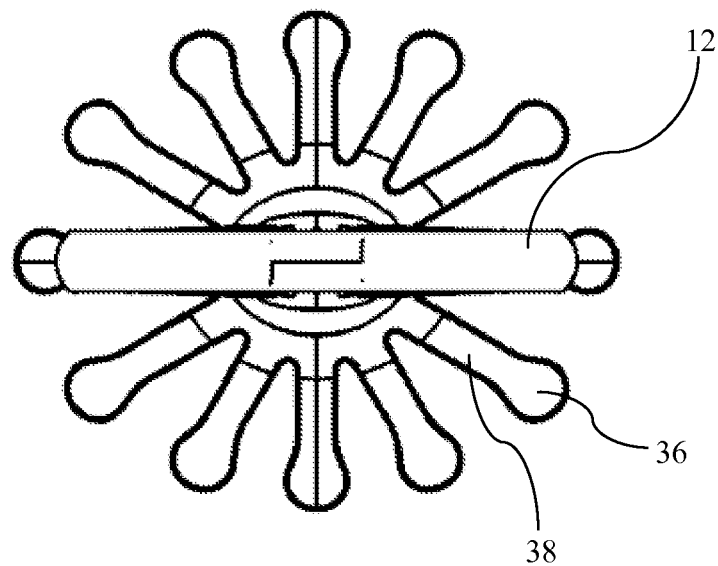
FIG. 3 is a top view of a preferred avocado tool.
Figure 4:
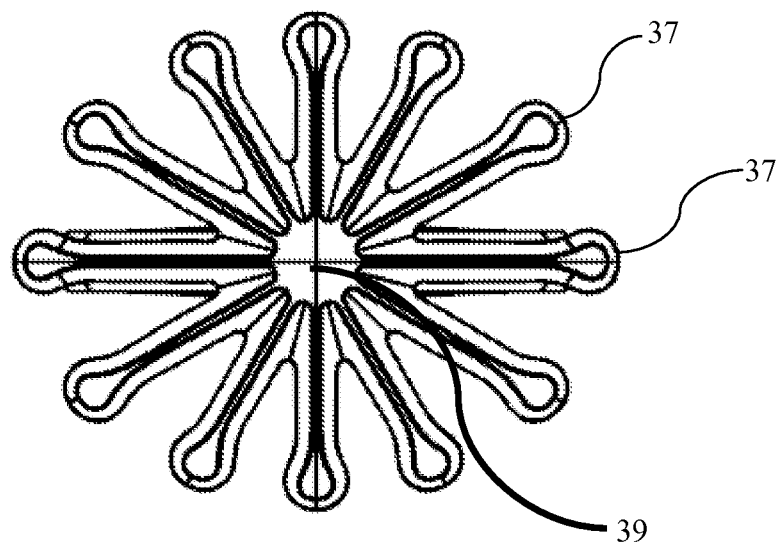
FIG. 4 is a bottom view of a preferred avocado tool.
Figure 5:
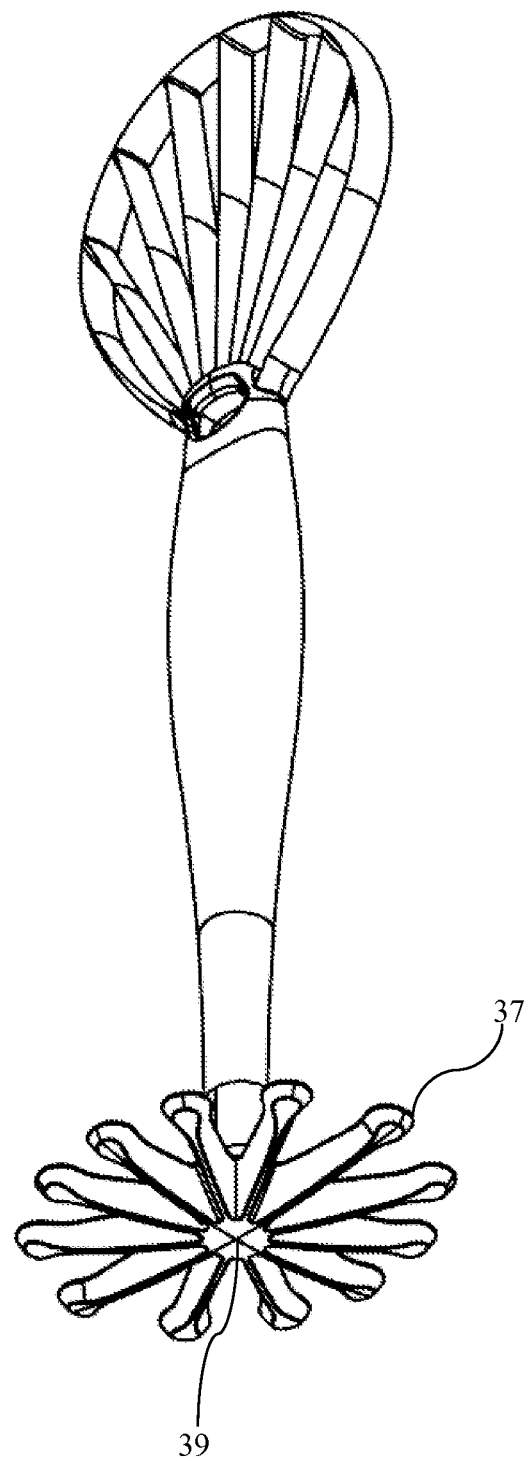
FIG. 5 is a bottom perspective view of a preferred avocado tool.

The preferred example of an avocado tool in accordance with the invention is illustrated in the figures and includes a slicing head 10, a mashing head 30, and a handle 20 secured to both the slicing head and the mashing head.

The slicing head in the preferred version includes a peripheral blade 12 forming a hoop extending away from the handle. The peripheral blade is sharpened on each edge (front and back), thereby forming a cutting edge for separating the flesh of an avocado from its peel. In the version as shown, the peripheral blade is in the form of a teardrop or pear shape, broadening as it extends away from the handle. In other versions, the peripheral blade may be differently shaped, such as more rounded or circular. In general, it is preferred that the distal end of the blade be shaped to mate with the inner peel of a standard sized avocado.

Within the hoop or slicing blade, a plurality of internal tines 14 is secured. The tines 14 emanate from the vicinity of the first end 22 of the handle 20, substantially adjacent the location where the ends of the hoop or slicing blade 12 are secured to the handle. In the preferred version as illustrated, the tines extend from the handle to a location along the slicing blade, with the tines being radially spaced apart from one another at generally equal angles. Thus, adjacent tines form wedge-shaped sections within the interior of the hoop, with each of the wedges being relatively similar to one another in size.

In the preferred version, the slicing head includes seven tines spaced apart within the interior of the space formed by the slicing blade, with each of the seven tines being secured to the handle at one end and to a portion of the hoop or slicing blade at the opposite end. In other versions any number of tines may be used, with the number of tines and size of the slicing head defining the size of the wedges that will be produced when using the slicing head to cut an avocado or other fruit.

The tines are formed in a generally planar shape, with each of them having an elongated shape in which the length is greater than the width and in which the height is as small as practically possible to provide structural strength and durability while allowing the tines to readily slice through an avocado like a knife. In the version as shown, the width of the tines is generally equal to the width of the slicing blade 12.

The slicing head may be formed in a variety of ways to provide a tool head capable of separating the flesh of an avocado from its peel while simultaneously slicing the flesh into sections. In the preferred version as illustrated, the entire slicing head is integrally from plastic using injection molding or other suitable plastic forming processes. In other versions, the slicing head may be constructed by forming separate tines and slicing blades from plastic or other materials and then joining them together using sonic welding, glues, or other means. In the preferred version as illustrated, the tines are sharpened on each edge (front and back) as with the peripheral blade 12.

In still other versions of the invention, the slicing head may be formed from stainless steel and the tines may be formed from metal wire, for example in the manner as described in any of U.S. Pat. Nos. 5,613,431; 5,533,442; or 7,055,247. In these patents, the peripheral slicing blade preferably includes holes formed about its perimeter, and a metal wire is fed between the perimeter holes and a stem adjacent the handle to support the wire. In yet another version, the tines may be formed of stainless steel and welded to a stainless steel slicing blade.

The handle 20 includes a first end 22 adjacent the slicing head 10 and a second end 24 adjacent the mashing head 30. Most preferably, the first end of the handle is somewhat larger and more bulbous than the second end in order to facilitate a better grip. Whether using the slicing head or the mashing head, a user may prefer to grip the handle at a location that is relatively closer to the slicing head, that is, closer to the first end of the handle. Accordingly, a portion of the handle at the first end of the handle is formed with a grip, and is larger in diameter than the second end of the handle.

The mashing head 30 is secured to the second end of the handle 20. In general, the mashing head is configured to facilitate the mashing of an avocado after it has been sliced and separated from its peel by the slicing head. In the preferred version as shown, the mashing head includes a central hub 39 secured to the second end of the handle and a plurality of spokes 37 secured to and extending radially away from the central hub.

The spokes include an upper surface 31 and a lower surface 32, with the upper surface facing toward the handle and the lower surface facing away from the handle. Most preferably, the spokes are tapered from the upper surface toward the lower surface to allow the spokes to cut into the avocado during the mashing process. The spokes further lie in a common plane, though the lower surface of the spokes are preferably curved upward slightly at the distal ends of the spokes, away from the hub.

Each of the spokes may have any size and shape, though a preferred version includes an elongated body 38 terminating in a tip 36 having a bulbous end as shown. In the illustrated version, twelve spokes are provided on the mashing head. In alternate versions, any number of spokes may be provided.

In yet other versions of the invention, the mashing head may be formed in a different shape. Though the hub and spoke version is preferred, the mashing head may alternatively be formed with crossed horizontal members, spokes that are curved rather than straight, or in other configurations that are capable of mashing. In either case, the mashing head incorporates a plurality of mashing arms forming a grid suitable for mashing, wherein the grid may in the form of a hub and spokes, parallel arms, crossing arms, or other configurations.

As with the slicing head, the mashing head may be formed from a variety of materials such as metals or plastics. In a preferred version, the mashing head is integrally formed from plastic using injection molding or other plastic forming processes. Likewise, in a preferred version the entire tool is integrally formed as a single unitary plastic tool.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An avocado tool, comprising:
   a handle having a first end and a second end;
   an avocado slicing tool head secured to the first end of the handle, the avocado slicing tool head having a peripheral blade forming an interior region and a plurality of slicing tines within the interior region; and
   a mashing tool head secured to the second end of the handle, the mashing tool head further having a central hub and a plurality of spokes extending radially outward from the central hub, each one of the plurality of spokes having an upper surface facing toward the handle and a lower surface facing away from the handle, each of the spokes being tapered as they extend from the upper surface toward the lower surface.

2. The avocado tool of claim 1, wherein the central hub is secured to the second end of the handle.

3. The avocado tool of claim 2, wherein at least one of the plurality of spokes includes an elongated main body terminating in a bulbous end opposite the central hub.

4. The avocado tool of claim 2, wherein each of the plurality of spokes includes an elongated main body terminating in a bulbous end opposite the central hub, and further wherein each of the spokes is adjoined to an adjacent one of the plurality of spokes only at the central hub.

5. The avocado tool of claim 2, wherein the plurality of spokes lie in a common plane.

6. The avocado tool of claim 5, wherein the plane is perpendicular to an axis defined by the handle.

7. The avocado tool of claim 1, wherein the lower surface of each of the plurality of spokes is curved upward in a direction toward the handle.

8. The avocado tool of claim 1, wherein the peripheral blade and the plurality of slicing tines are integrally formed from plastic.

9. An avocado tool, comprising:
   a handle having a first end and a second end;
   an avocado slicing tool head secured to the first end of the handle, the avocado slicing tool head having a peripheral blade and a plurality of slicing tines secured between the first end of the handle and the peripheral blade; and
   a mashing tool head secured to the second end of the handle, the mashing tool head further having a central hub and a plurality of spokes extending radially outward from the central hub, each one of the plurality of spokes being attached to the central hub but otherwise not being attached to any other ones of the plurality of spokes, each one of the plurality of spokes further having an upper surface facing toward the handle and a lower surface facing away from the handle, each of the spokes being tapered as they extend from the upper surface toward the lower surface.

10. The avocado tool of claim 9, wherein each of the plurality of spokes includes an elongated main body terminating in a bulbous end opposite the central hub.

11. The avocado tool of claim 10, wherein the lower surface of each of the plurality of spokes is curved upward in a direction toward the handle from the central hub to the bulbous end.

* * * * *